UNITED STATES PATENT OFFICE.

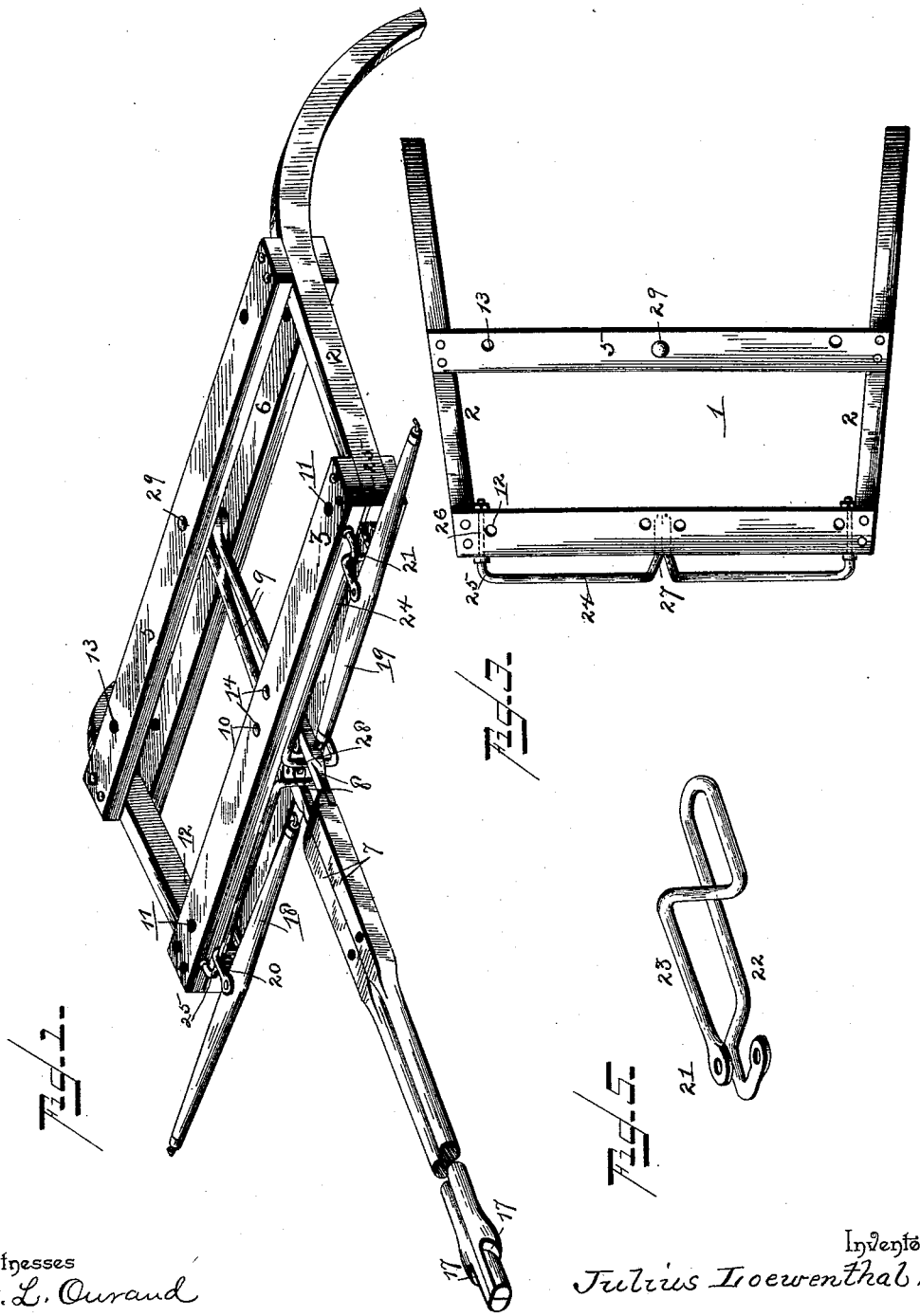

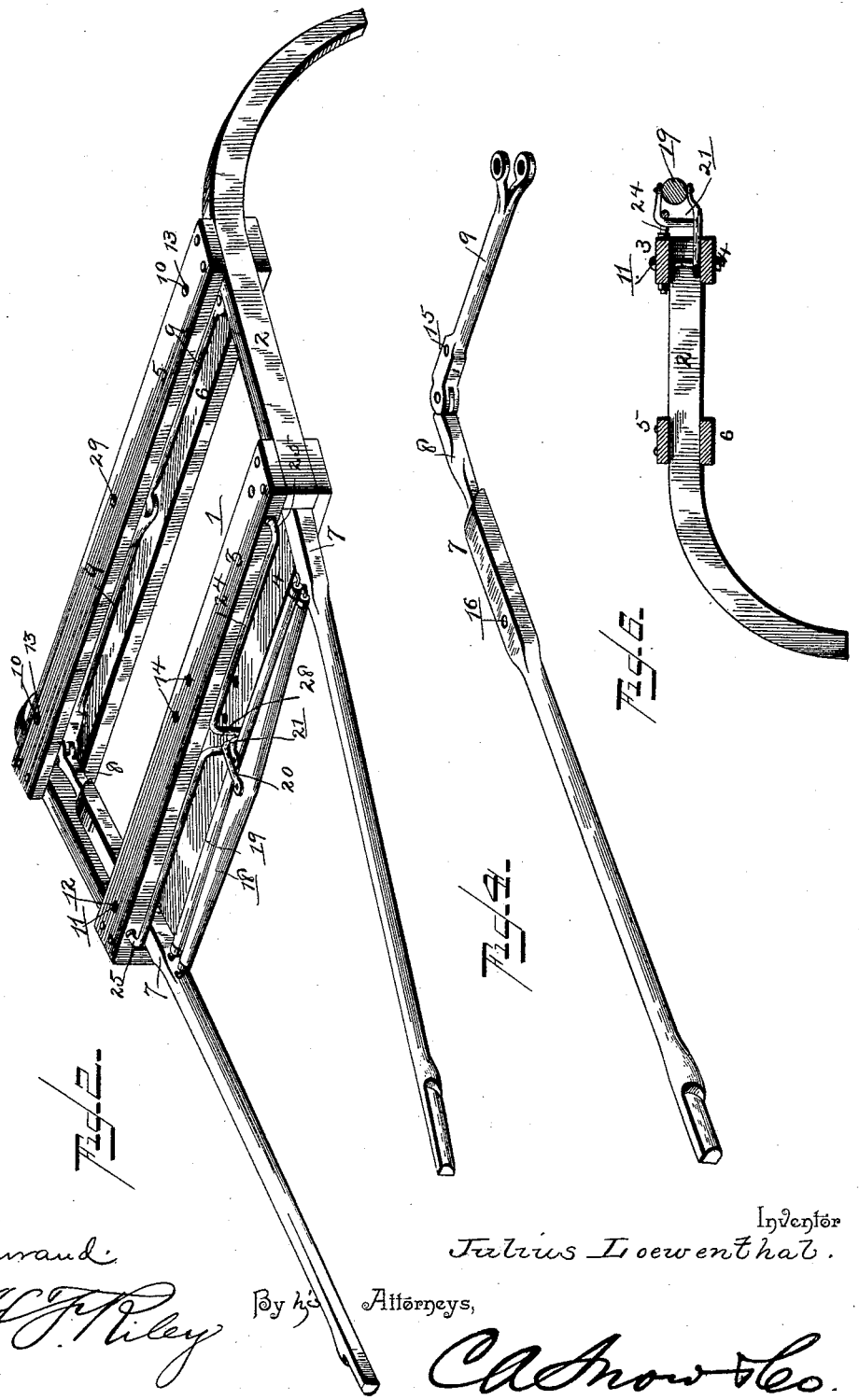

JULIUS LOEWENTHAL, OF PADUCAH, KENTUCKY.

POLE AND SHAFTS FOR VEHICLES.

SPECIFICATION forming part of Letters Patent No. 434,797, dated August 19, 1890.

Application filed April 29, 1890. Serial No. 349,909. (No model.)

*To all whom it may concern:*

Be it known that I, JULIUS LOWENTHAL, a citizen of the United States, residing at Paducah, in the county of McCracken and State of Kentucky, have invented a new and useful Tongue and Shafts, of which the following is a specification.

The invention relates to improvements in tongues and shafts.

The object of the present invention is to provide a simple and inexpensive device which will possess strength and lightness and which will be capable of being quickly converted into a pole or shafts and readily changed from either to the other.

The invention consists in the construction and novel combination and arrangement of parts, hereinafter fully described, illustrated in the accompanying drawings, and pointed out in the claims hereto appended.

In the drawings, Figure 1 is a perspective view of a device constructed in accordance with this invention and illustrating the parts arranged to form a pole or tongue. Fig. 2 is a similar view, the parts being arranged to form a pair of shafts or thills. Fig. 3 is a detail view of the frame. Fig. 4 is a similar view of one of the shafts and a hinged bar. Fig. 5 is a detail perspective view of one of the whiffletree-clips. Fig. 6 is a cross-section on the line $x$ $x$, Fig. 1.

Referring to the accompanying drawings, 1 designates a frame adapted to be secured to a front axle of the running-gear of a vehicle and composed of the curved side bars 2 and parallel cross-bars 3, 4, 5, and 6, which are arranged in pairs and have their ends secured to the upper and lower faces of the curved side bars 2 and are separated by spaces in which are arranged shafts or thills 7, which have secured to their rear ends bars 8, that are hinged to bars 9, having their rear ends pivoted centrally between the rear top and bottom cross-bars 5 and 6. The shafts or thills 7 are adapted to be arranged at the sides of the frame in the usual manner, and the bars 9 are arranged parallel with the rear cross-bar, and the said thills can also be arranged, as illustrated in Fig. 1 of the accompanying drawings, to form a pole or tongue, and they are slightly increased in length by the bars 9, which are brought in alignment with the thills or shafts and arranged adjacent to each other, the thills or shafts being also together and projecting forward from the center of the frame. The shafts or thills are maintained in their several positions by bolts 10 and 11, which pass through perforations 12, 13, and 14 of the cross-bar, and perforations 15 of the hinged bar 9, and 16 of the thills 7. When the parts are arranged to form a pair of shafts or thills, the bolts 10 pass through the perforations 13 of the rear cross-bars and the perforations 15 of the hinge-bars 9 and secure the latter between the cross bars 5 and 6, and the bolts 11 are arranged in the perforations 12 of the front cross-bars and they secure the shafts or thills at the sides of the frame 1.

In arranging the parts to form a tongue the shafts or thills are extended and brought in alignment with the hinge-bars 9, and extend centrally from the front of the frame 1, and are secured in that position by the bolts 10, which are taken from the perforations 13 and arranged in the perforations 14, and the ends of the shafts are provided with oppositely-disposed shoulders or notches 17, which are adapted to be engaged by a neckyoke center in the usual manner.

Whiffletrees 18 and 19 are adapted to be arranged at the sides of the frame 1, when the parts are in position to form a tongue, and they are adapted to be arranged centrally when the thills are arranged at the sides of the frame, and the said whiffletrees are provided with clips 20 and 21, having straight arms or sides 22, secured to the lower face of a whiffletree, and L-shaped arms or sides 23, pivoted to the upper face of a whiffletree, and the said clips are pivoted at the sides of the frames by the bolts 11, as illustrated in Fig. 1 of the accompanying drawings, or they may be arranged as shown in Fig. 2. The front of the frame is provided with guide-bars 24, which are arranged parallel with the front face of the upper cross-bar 3, and have their outer ends 25 secured in horizontal perforations 26 of the upper front cross-bar, and the inner adjacent ends 27 meet at the center of the frame and are bent downward to form vertical portions 28, and rearward, and are secured to the lower face of the bottom front cross-bar 4. The draft-clips travel on the guide-bar 24, and the clip 20 is slightly larger than the clip 21, and is adapted to receive the whiffletree 19, to enable the whiffletrees to be arranged parallel with each other, as illustrated in Fig. 2, the loop portions of the clips being arranged on the vertical portions 28 of the guide-arms. The hinged bars 9 are centrally pivoted in the space between the rear cross-bars by a bolt 29, and the end of one of the hinged bars is bifurcated and arranged upon each side of the other hinged bar, and the said bars 9 are provided with eyes to receive the bolt 29. The lower ends of the bolt are provided with nuts and are adapted to be readily removed to change the device from one position to the other, and it will be readily seen that there are no superfluous parts to be carried separate from the device. The distance between the front and rear cross-bars is somewhat less than half the distance between the curved side pieces 2, and the distance between the perforations 10 and the bolt 29 is the same as the distance between that bolt and the perforations 14, to enable the perforations 15 of the hinged bar 9 to be readily engaged by the bolts 12.

What I claim is—

1. The combination of the frame, the thills, the bars 9, having their rear ends pivoted centrally to the frame and their front ends hinged to the thills and provided with perforations, and the bolts 10, adapted to secure the bars 9 to the rear cross-bars and to the front cross-bars, substantially as described.

2. The combination of the frame composed of the side bars, the rear cross-bars provided with perforations 13, arranged at the ends, and the front cross-bars provided with the perforations 14, arranged at the center of the bars, the thills, the bars 9, having their rear ends centrally pivoted between the rear cross-bars and their front ends hinged to the thills and being provided with perforations 15, the bolts 12, adapted to be arranged in the perforations of the cross-bars, and the bolts 10, substantially as described.

3. The combination of the frame composed of the side bars 2, the rear cross-bars provided with perforations 13, and the front cross-bars having the perforations 11, arranged at the ends thereof, and the perforations 14, arranged at points intermediate of the ends, the thills having the perforations 16, the hinged bars centrally pivoted between the rear cross-bar and provided with perforations 15, and the bolts 10 and 11, substantially as described.

4. The combination of the frame, the thills, the bars 9, hinged to the thills, pivoted centrally in the rear of the frame, the guide-bars secured at the front of the frame, and the whiffletrees provided with clips traveling upon the guide-bars and adapted to be secured at the sides and at the center of the frame, substantially as described.

5. The combination of the frame, the adjustable thills, the guide-bars secured at the front of the frame and provided with the vertical portions 28, the whiffletrees, and the clips pivoted to the whiffletrees and arranged upon the guide-bars and having a straight side 22 and an L-shaped side 23, substantially as and for the purpose described.

6. The combination of the frame 1, adapted to be secured to an axle, the thills or shafts and the bars 9, centrally pivoted in the frame and hinged to the rear ends of the thills or shafts, whereby the thills or shafts are adapted to be arranged at the sides of the frame or at the middle thereof to form a tongue, the removable bolts 10, adapted to secure the parts in either position, the guide-bars 24 at the front of the frame, and the draft-clips for the whiffletrees traveling on the guide-bars, substantially as described.

In testimony that I claim the foregoing as my own I have hereto affixed my signature in presence of two witnesses.

JULIUS LOEWENTHAL.

Witnesses:
GEO. H. ROBERTSON,
W. A. PITMAN.